(12) United States Patent
Wilson

(10) Patent No.: US 10,542,844 B2
(45) Date of Patent: Jan. 28, 2020

(54) CUTTING SURFACE WITH INTEGRATED MEASURING RECEPTACLES

(71) Applicant: Meredith Wilson, Colorado Springs, CO (US)

(72) Inventor: Meredith Wilson, Colorado Springs, CO (US)

( * ) Notice: Subject to any disclaimer, the term of this patent is extended or adjusted under 35 U.S.C. 154(b) by 0 days.

(21) Appl. No.: 14/292,160

(22) Filed: May 30, 2014

(65) Prior Publication Data

US 2015/0342415 A1 Dec. 3, 2015

(51) Int. Cl.
*A47J 47/00* (2006.01)
*G01F 19/00* (2006.01)

(52) U.S. Cl.
CPC ............ *A47J 47/005* (2013.01); *G01F 19/00* (2013.01); *G01F 19/002* (2013.01)

(58) Field of Classification Search
CPC ....... A47J 47/005; A47J 47/20; Y10T 83/222; G01F 19/002
USPC .................. 269/15, 289 R; 220/23.86–23.89; 206/564
See application file for complete search history.

(56) References Cited

U.S. PATENT DOCUMENTS

| | | | | |
|---|---|---|---|---|
| 1,659,344 A | * | 2/1928 | Wissman | A47G 23/065 294/143 |
| 1,922,973 A | * | 8/1933 | Mischanski | A47J 43/25 241/273.1 |
| 2,550,896 A | * | 5/1951 | Wickner | A47J 43/25 220/8 |
| 2,796,902 A | * | 6/1957 | Mercury | A22C 17/0013 269/13 |
| 2,878,932 A | * | 3/1959 | Martire, Jr. | A47G 23/06 206/564 |
| 2,942,921 A | * | 6/1960 | Rachman | A47B 3/0916 108/26 |
| 3,117,400 A | * | 1/1964 | Martin | B24D 7/00 451/548 |
| 3,598,164 A | * | 8/1971 | August | A47J 47/005 269/13 |
| 3,768,710 A | * | 10/1973 | Eggers | A47G 23/0208 211/133.1 |
| 3,799,386 A | * | 3/1974 | Madalin | B65D 25/2897 206/564 |

(Continued)

FOREIGN PATENT DOCUMENTS

KR 20130113852 10/2013

*Primary Examiner* — Tyrone V Hall, Jr.
(74) *Attorney, Agent, or Firm* — McAndrews, Held & Malloy, Ltd.

(57) ABSTRACT

The present invention is directed to a device, such as a cutting board, that comprises an upper planar surface that is useful for the breaking-down of articles, such as the chopping, crushing, and slicing of food articles, and one or more measuring receptacles integrated into the device such that the one or more receptacles are substantially flush with the planar surface. Using the device, one may break down articles, such as food articles, and easily transfer the broken-down portions of the articles to a measuring receptacle without having to remove the broken-down portions of the articles from the cutting board. The measuring receptacle may then be removed from the device, by which the measured portion of the article may be transferred away from the cutting board, such as to a separate pot or pan in the case of food articles.

15 Claims, 5 Drawing Sheets

(56) References Cited

U.S. PATENT DOCUMENTS

| | | | | |
|---|---|---|---|---|
| 4,196,807 A * | 4/1980 | Brom | B65D 71/0007 | 206/197 |
| D267,463 S * | 1/1983 | Thompson | | D6/664 |
| 4,653,737 A * | 3/1987 | Haskins | A47J 47/005 | 269/13 |
| 4,947,991 A * | 8/1990 | Snell | A47G 23/0641 | 206/427 |
| D320,537 S * | 10/1991 | Sauter | | D7/552.2 |
| 5,104,168 A * | 4/1992 | Magee | A47G 23/06 | 206/558 |
| D341,298 S * | 11/1993 | Ancona | | D7/553.3 |
| 5,363,755 A * | 11/1994 | Liang | A47B 77/02 | 241/273.2 |
| 5,423,451 A | 6/1995 | Snyder | | |
| 5,915,561 A * | 6/1999 | Lorenzana | A47G 23/0608 | 206/562 |
| 5,924,352 A * | 7/1999 | Lothe | B26B 29/06 | 220/528 |
| 6,283,566 B1 * | 9/2001 | Doces | A47B 81/04 | 211/71.01 |
| 6,311,841 B1 * | 11/2001 | Hodges | A45C 11/20 | 206/541 |
| 6,338,171 B1 * | 1/2002 | Dandridge | A47J 47/20 | 4/657 |
| 6,359,239 B1 | 3/2002 | Missler et al. | | |
| 6,371,470 B1 * | 4/2002 | Ward | A47J 47/005 | 269/13 |
| 6,386,531 B1 * | 5/2002 | Prosser | A47J 47/005 | 269/15 |
| 6,513,803 B2 * | 2/2003 | Morales | G01N 1/04 | 269/15 |
| D505,347 S * | 5/2005 | Huang | | D10/87 |
| 6,994,334 B2 * | 2/2006 | Jones | B23Q 11/0042 | 269/289 R |
| 6,994,336 B2 * | 2/2006 | Loo | A47J 47/005 | 269/289 R |
| 7,252,255 B2 * | 8/2007 | Cornfield | G01G 19/56 | 241/274 |
| 7,258,289 B1 * | 8/2007 | Butt | A47J 47/005 | 241/100 |
| D587,031 S * | 2/2009 | Pourounidis | A47J 47/005 | D7/698 |
| 7,562,787 B2 * | 7/2009 | Serrano | A47G 23/0208 | 206/139 |
| 7,637,154 B1 * | 12/2009 | Robbins | G01F 19/00 | 220/530 |
| 7,681,852 B2 * | 3/2010 | Magee | B60N 3/002 | 206/562 |
| 7,735,816 B2 * | 6/2010 | Hashim | A47J 47/005 | 269/289 R |
| 7,874,449 B1 * | 1/2011 | Studee | A47G 19/02 | 206/219 |
| 8,220,789 B2 * | 7/2012 | Pourounidis | A47J 47/005 | 206/216 |
| 8,246,190 B2 * | 8/2012 | Boiteau | A47G 23/0641 | 206/139 |
| 8,330,057 B2 * | 12/2012 | Sharawi | G01G 19/4146 | 177/238 |
| D679,557 S * | 4/2013 | Wardell | | D7/698 |
| 8,567,640 B1 * | 10/2013 | Johnson-Lofton | A61J 7/0069 | 211/59.2 |
| 2001/0040328 A1 * | 11/2001 | Keener | A47J 47/005 | 269/289 R |
| 2003/0034234 A1 * | 2/2003 | Neumann | B65H 15/00 | 198/840 |
| 2004/0094587 A1 * | 5/2004 | Harden | B60N 3/002 | 224/275 |
| 2005/0039607 A1 * | 2/2005 | Cornfield | A47J 47/005 | 99/324 |
| 2005/0160807 A1 * | 7/2005 | Kilduff | G01F 19/002 | 73/426 |
| 2008/0084019 A1 | 4/2008 | Casale et al. | | |
| 2008/0149552 A1 * | 6/2008 | Murphy | A47J 43/24 | 210/251 |
| 2009/0045277 A1 * | 2/2009 | Shamoon | A47J 47/005 | 241/274 |
| 2009/0281556 A1 * | 11/2009 | Newell | A61B 17/0401 | 606/144 |
| 2010/0301050 A1 * | 12/2010 | Garland | B65F 1/10 | 220/495.08 |
| 2011/0095465 A1 * | 4/2011 | Vlahos | A47J 47/005 | 269/16 |
| 2014/0186805 A1 * | 7/2014 | Pordy | G09B 19/0092 | 434/127 |
| 2014/0225320 A1 * | 8/2014 | Gotsis | A47J 47/005 | 269/14 |
| 2015/0108702 A1 * | 4/2015 | Quanh | A47J 47/005 | 269/289 R |

* cited by examiner

CUTTING SURFACE WITH INTEGRATED MEASURING RECEPTACLES

BACKGROUND OF THE INVENTION

Cutting boards are used throughout the world, most notably in both home kitchens and commercial kitchens for the breaking down of food articles such as meats and produce. A kitchen cutting board is comprised of a material, such as wood, plastic, glass, metal, a composite of recycled material, etc., forming a flat surface on which food articles are chopped, sliced, diced, cut, crushed, or otherwise broken down. Cutting boards are used to protect counter surfaces and to provide for a comfortable and uncomplicated cleaning of the cutting surface. In order to measure out a particular amount of the broken-down food articles, as is often required by a recipe, one must transfer the broken-down food articles from the cutting board to a measuring receptacle, such as a common measuring cup. There is currently, however, no straightforward way to move the broken-down food articles from the cutting board into the measuring cup. Rather, one is often forced to either pick up the broken-down food articles, using one's hands and/or a utensil, or to pick up the cutting board and attempt to scrape the broken-down food articles into a self-standing measuring cup. These methods are often messy, inaccurate, inefficient, and sometimes, such as when dealing with raw meats, unhygienic.

The present invention provides an improved cutting board that is configured to provide for a cleaner, more accurate, and more efficient transfer of broken-down food articles from the cutting board to a measuring receptacle, such as a measuring cup.

SUMMARY OF THE INVENTION

Embodiments of the present invention are directed to a device comprising an upper planar surface and one or more receptacles integrated with the planar surface such that the tops of the one or more receptacles are substantially flush with the planar surface. Using this device, one may chop, slice, dice, cut, crush, or otherwise break an article down into fragments and directly transfer those fragments into any one of the one or more receptacles without removing the fragments from the device. The one or more receptacles may be configured to have particular volumes. One may thus measure out a desired amount of fragments by transferring the fragments into a receptacle of the desired volume.

The one or more receptacles may be individually removable from the device, such as through the use of one or more handles. In some embodiments, each of the one or more receptacles may have an individual handle integrally connected to the receptacle. In other embodiments, the device may comprise one or more handles that are configured to removably connect to the one or more receptacles. In some embodiments, for example, a handle may be connected to any of the one or more receptacles in order to provide for removal of the receptacle from the device.

In some embodiments, the device may comprise a base and a cutting surface, the base and the cutting surface being configured to provide an upper planar surface, and one or more receptacles integrated with the device such that the tops of the one or more receptacles are substantially flush with the planar surface. The cutting surface may be removable from the base. The one or more receptacles, which are coupled with the base, may be individually removable from the base. Accordingly, each of the cutting surface, the one or more receptacles, and the base are configured to be separately washed and/or stored. In some embodiments, the base may also be collapsed for easy storage.

In some embodiments, the device is a cutting board, such as may be used in a home kitchen or commercial kitchen. The receptacles are therefore configured to have volumes used in measuring amounts of food when cooking or baking, such as a cup, a fraction of a cup, a tablespoon, a fraction of a tablespoon, a teaspoon, and a fraction of a teaspoon. At least a portion of the upper planar surface provides a cutting surface. One may use the cutting surface to chop, slice, dice, cut, crush, or otherwise break down a food article, such as may be selected from the group consisting of vegetables, meats, herbs, spices, and the like. Using the same instrument that was used to break down the food, typically a kitchen knife, one may directly transfer the broken-down food to any of the one or more receptacles in order to measure out a specific amount of food. The broken-down food does not need to be removed from contact with the cutting board in order to be transferred to the measuring receptacle. By lifting the measuring receptacle out of contact with the cutting board, the measured food may then be easily transferred from the cutting board to a pot, pan, bowl, plate, or the like.

In some embodiments, the device may also comprise one or more receptacles that are configured for storing food waste. Accordingly, one may clear space on the cutting surface by directly transferring unwanted food fragments into the waste receptacle, e.g. without removing the unwanted food fragments from contact with the cutting board. The cutting board may also be integrated into a fixed or mobile system, such as a cooking preparatory workstation.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
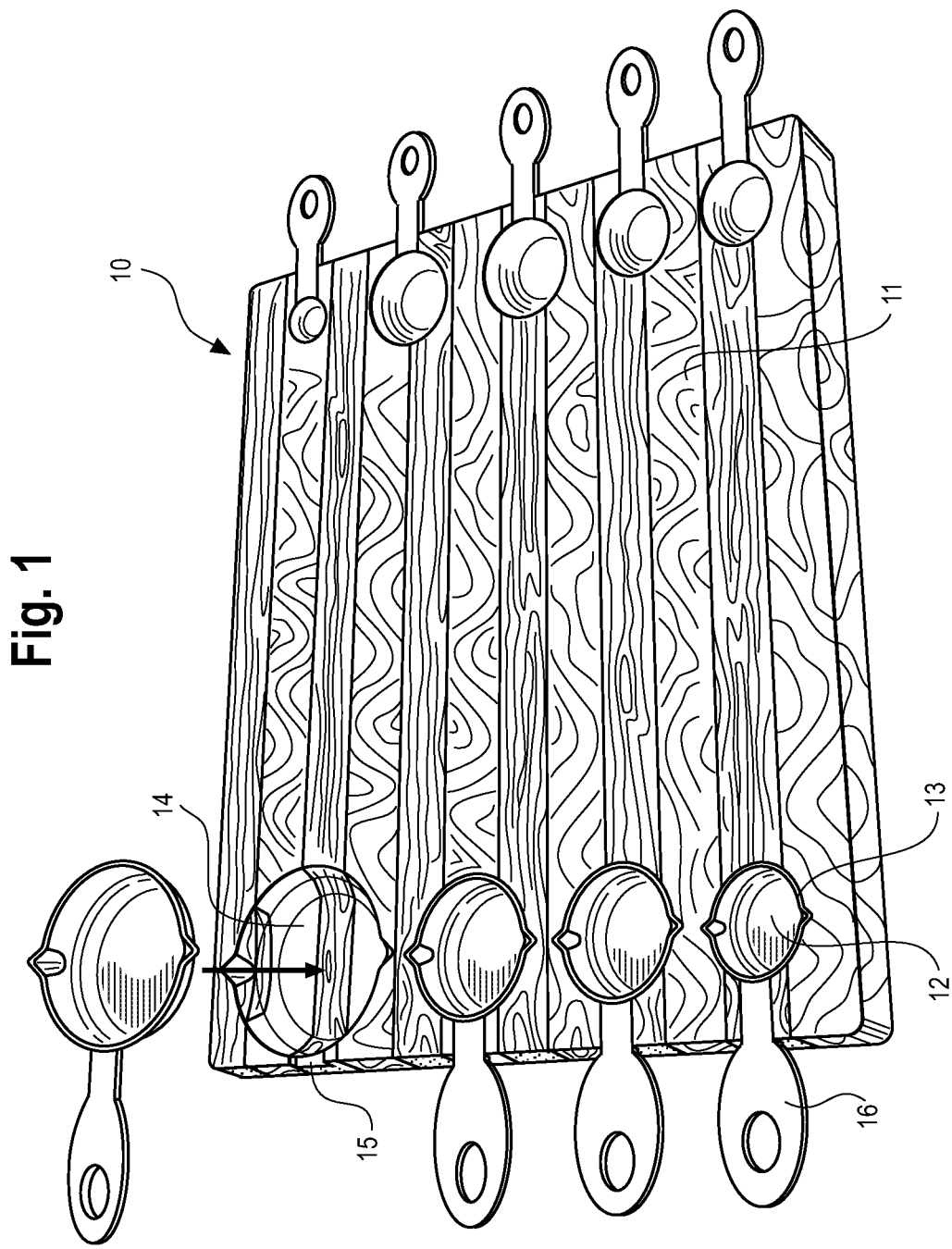
FIG. 1 is a perspective view of an embodiment of a device comprising a cutting surface with integrated measuring receptacles, each receptacle having a handle for removing the receptacle from the device.

Reference will now be made in detail to certain embodiment(s), examples of which are illustrated in the accompanying drawings. Whenever possible, the same reference numerals will be used throughout the drawings to refer to the same or like parts.

One embodiment of the device is shown in FIG. 1. The device, also referred to throughout the detailed description as a cutting board 10, comprises an upper planar surface 11 and one or more measuring receptacles 12, the one or more measuring receptacles being integrated into the cutting board. The measuring receptacles 12 are integrated with the cutting board 10 such that the top surfaces of the walls of the receptacles 13 are substantially flush with the upper planar surface 11.

By substantially flush, it is meant that the top of the walls of the receptacles 13 are either in the same plane as the upper planar surface 11 or slightly set in from the plane defined by the upper planar surface. For instance, the top of the walls of the receptacles 13 may be either planar with or no more than one quarter of an inch below the upper planar surface 11. More desirably the top of the walls of the receptacles 13 are no more than one eighth of an inch below the upper planar surface 11. The top of the walls of the receptacles 13 should not extend above the upper planar surface 11.

The size of each of the one or more receptacles 12 may be selected depending on the desired use of the cutting board 10. The receptacles 12 may include, for example, a receptacle for measuring one cup, a receptacle for measuring one-half of a cup, a receptacle for measuring one-third of a cup, a receptacle for measuring one-quarter of a cup, and/or a receptacle for measuring one-eighth of a cup. The receptacles 12 may also include, for example, a receptacle for measuring one tablespoon, a receptacle for measuring one-half of a tablespoon, a receptacle for measuring one-third of a tablespoon, a receptacle for measuring one-quarter of a tablespoon, and/or a receptacle for measuring one-eighth of a tablespoon. In other embodiments, the cutting board 10 may comprise one or more receptacles 12 for measuring even smaller amounts, such as a receptacle for measuring one teaspoon, a receptacle for measuring one-half of a teaspoon, a receptacle for measuring one-third of a teaspoon, a receptacle for measuring one-quarter of a teaspoon, and/or a receptacle for measuring one-eighth of a teaspoon.

In the embodiment illustrated in FIG. 1, receptacles 12 configured for measuring a cup, fractions of a cup, a tablespoon, fractions of a tablespoon, and a teaspoon are integrated into the cutting board 10. In other embodiments, for example, the cutting board 10 may comprise only receptacles 12 for measuring cups and/or fractions of a cup. In other embodiments, the cutting board 10 may comprise only receptacles 12 for measuring tablespoons and/or fractions of a tablespoon. In yet other embodiments, the cutting board 10 may comprise only receptacles 12 for measuring teaspoons and/or fractions of a teaspoon.

For example, one embodiment of the cutting board 10 may be configured for the crushing or chopping of herbs, spices, seeds, and the like, and may comprise receptacles 12 that measure only teaspoons, fractions of a teaspoon, tablespoons, and/or fractions of a tablespoon. Another embodiment of the cutting board 10 may be configured for the chopping of vegetables and/or meats and may comprise only receptacles for measuring cups and/or fractions of a cup. Other embodiments may comprise receptacles 12 configured for measuring any combination of the measurements described above, as may be selected depending on the desired use of the cutting board 10.

Although embodiments of the cutting board 10 described above have receptacles 12 that are configured to obtain the most common measurements used in a kitchen (i.e. cups, tablespoons, and teaspoons), it should be understood that the receptacles may be configured to measure different amounts, using any known units or standards, without departing from the scope of the present invention.

The number of receptacles 12 may also be selected depending on the desired use of the cutting board 10. In the embodiment illustrated in FIG. 1, nine receptacles 12, each having a different volume, are integrated into the cutting board 10. In other embodiments, the number of receptacles 12 may be lower than the embodiment illustrated in FIG. 1. For example, in some embodiment, the cutting board 10 may only comprise a single measuring receptacle 12. In other embodiments, the number of receptacles 12 may be higher than the embodiment illustrated in FIG. 1.

In some embodiments, a single measuring receptacle 12 may be configured to be capable of use for measuring more than one volume of broken-down articles. For instance, some embodiments of the cutting board 10 may include a receptacle 12 that is configured to measure both one cup and one or more of the following: one-half of a cup, one-third of a cup, one-quarter of a cup, and one-eighth of a cup. The receptacle 12 may, for example, have various markings along its interior wall indicating each of the different amounts, as is known in the art. Accordingly, one embodiment of the cutting board 10 may be configured to have three receptacles 12, one being configured to measure a cup and one or more fractions of a cup, one being configured to measure a tablespoon and one or more fractions of a tablespoon, and one being configured to measure a teaspoon and one or more fractions of a teaspoon. Another embodiment of the cutting board 10 may be configured to have one receptacle 12, the one receptacle being configured to measure both a cup and one or more fractions of a cup, for example.

The location of the one or more receptacles 12 may also be selected depending on the desired use of the cutting board 10. For example, in the embodiment illustrated in FIG. 1, the cutting board 10 comprises a series of larger receptacles 12 across the left side of the cutting board and a series of smaller receptacles across the right side. In other embodiments, however, receptacles 12 may only be present on either the left side of the cutting board or the right side of the cutting board. Alternatively, receptacles 12 may be located, for example, at one or more of the corners of the cutting board 10 or along the top edge of the cutting board. In other embodiments, the cutting board 10 may not be rectangular, as illustrated in FIG. 1, but may rather be circular, ovular, or taking on any number of themed shapes. The one or more receptacles 12 may be provided at various locations on a cutting board 10 having a different shape without departing from the scope of the present invention. However, for ease of removal, and to provide a consistent cutting surface, it may be desirable that the receptacles 12 are generally located around the perimeter of the upper planar surface 11.

As illustrated in FIG. 1, the one or more receptacles 12 may be set into the cutting board 10. For example, the cutting board 10 may comprise one or more recesses 14, the one or more recesses each being configured to couple with a specific receptacle 12 having an identified volume. The visible lower surface of the recess 14 may indicate the volume of the specific receptacle 12 to which it is configured to couple. In some embodiments, for example, the recesses 14 may be hollowed out of the material that makes up the cutting board 10. The recesses 14 may also be coated with a material that reduces the friction between the receptacle 12 and the walls of the recess, such as to provide for an easy removal of the receptacle from the recess. Each recess 14 is configured to support the receptacle 12 such that the top of the receptacle walls 13 are substantially flush with the upper planar surface 11, as described above. In some embodiments, the one or more receptacles 12 may also be integrated with the cutting board 10 in other ways, so long as the top of the receptacle walls 13 are substantially flush with the upper planar surface 11. For example, instead of the receptacle 12 being inserted into a recess 14 in a manner that provides for one to lift the receptacle out of the recess, the receptacle cutting board 10 may be configured such that the receptacle 12 may slide into and out of a recess located on a side wall of the cutting board.

In embodiments of the cutting board 10, the one or more receptacles 12 are easily removable. For example, as illustrated in FIG. 1, each receptacle 12 may comprise a handle 16. The handle 16, for instance, may be integrally molded with the receptacle 12. In some embodiments, in order to provide that the top of the receptacle walls 13 are substantially flush with the upper planar surface 11, the cutting board 10 may also comprise a recess 15 that is configured to couple with the handle 16. In other embodiments, the handle 16 may be configured to extend upward from the top of the receptacle walls 13, so that the handle does not interfere with the coupling of the receptacle 12 and the recess 14. For example, the handle 16 may be configured to sit directly over the upper planar surface 11, which may also provide an easy way for a user to ensure that the receptacle 12 has been inserted into the recess 14 such that the top of the receptacle walls 13 is substantially flush with the upper planar surface 11. Additionally, although the handles 16 illustrated in FIG. 1 extend well beyond the sides of the cutting board 10, other embodiments may comprise handles 16 that extend only slightly beyond the sides of the cutting board. The design and appearance of the handles may also vary without departing from the scope of the present invention.

In other embodiments, the cutting board 10 may comprise one or more separable handles 16, each handle being configured to couple with one or more of the receptacles 12. Accordingly, a handle 16 may be connected to the receptacle 12 in order to remove the receptacle from the cutting board 10 and, if desired, to integrate the receptacle with the cutting board. The handle 16 may also, however, be removed from the receptacle 12. This may provide for an easier and more efficient cleaning and storage of the cutting board 10 with the receptacles 12 integrated therein.

Figure 2:
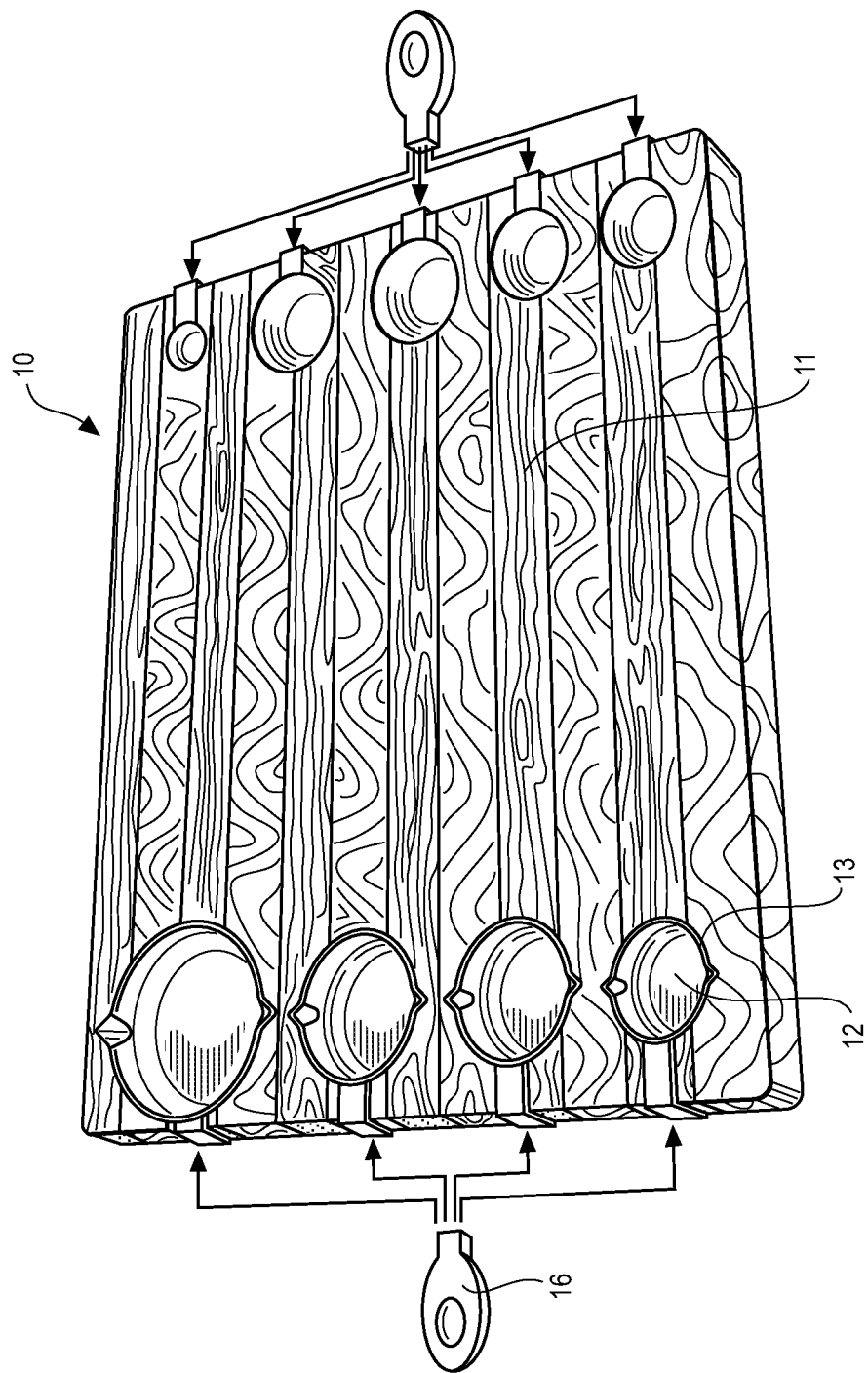
FIG. 2 is a perspective view of an embodiment of a device comprising a cutting surface with integrated measuring receptacles, further comprising a handle that may be used to remove the receptacles from the device.

For example, as illustrated in FIG. 2, the cutting board 10 may include a handle 16 that is coupleable with some or all of the receptacles 12. In this embodiment, the cutting board 10 may be configured such that it can easily be washed and stored without removing the receptacles 12. It is also contemplated that embodiments such as that illustrated in FIG. 2 may be particularly useful when the cutting board 10 is integrated into a kitchen workstation or otherwise maintained on a working surface, since embodiments using one or more removable handles 16 could be configured to have a streamlined profile when the handle(s) are not connected. For example, by using one or more removable handles 16, the cutting board 10 with the integrated receptacles 12 may be configured such that there are ordinarily no handles or other components extending beyond the periphery of the board.

In some embodiments, the cutting board 10 may comprise a receptacle that is configured for storing waste 17. The waste receptacle 17 may be integrated into the cutting board 10 in the same manner as the one or more measuring receptacles 12. As with the one or more measuring receptacles 12, the waste receptacle 17 is integrated with the cutting board 10 such that the top of the waste receptacle wall is substantially flush with the upper planar surface 11. An embodiment of a cutting board 10 comprising a waste receptacle 17 is illustrated in FIG. 3.

The waste receptacle 17 may also be removably inset into a recess in the cutting board 10. The waste receptacle 17 may comprise an element, including but not limited to a handle, by which the waste receptacle may be gripped and removed from the cutting board 10. This provides a user with the ability to remove and empty the waste receptacle 17 without having to move the cutting board 10 or otherwise disturb any food articles that may be present on the upper planar surface 11. Alternatively, the waste receptacle 17 may be configured to be attached to the cutting board 10 such that it is not removable.

Figure 3:
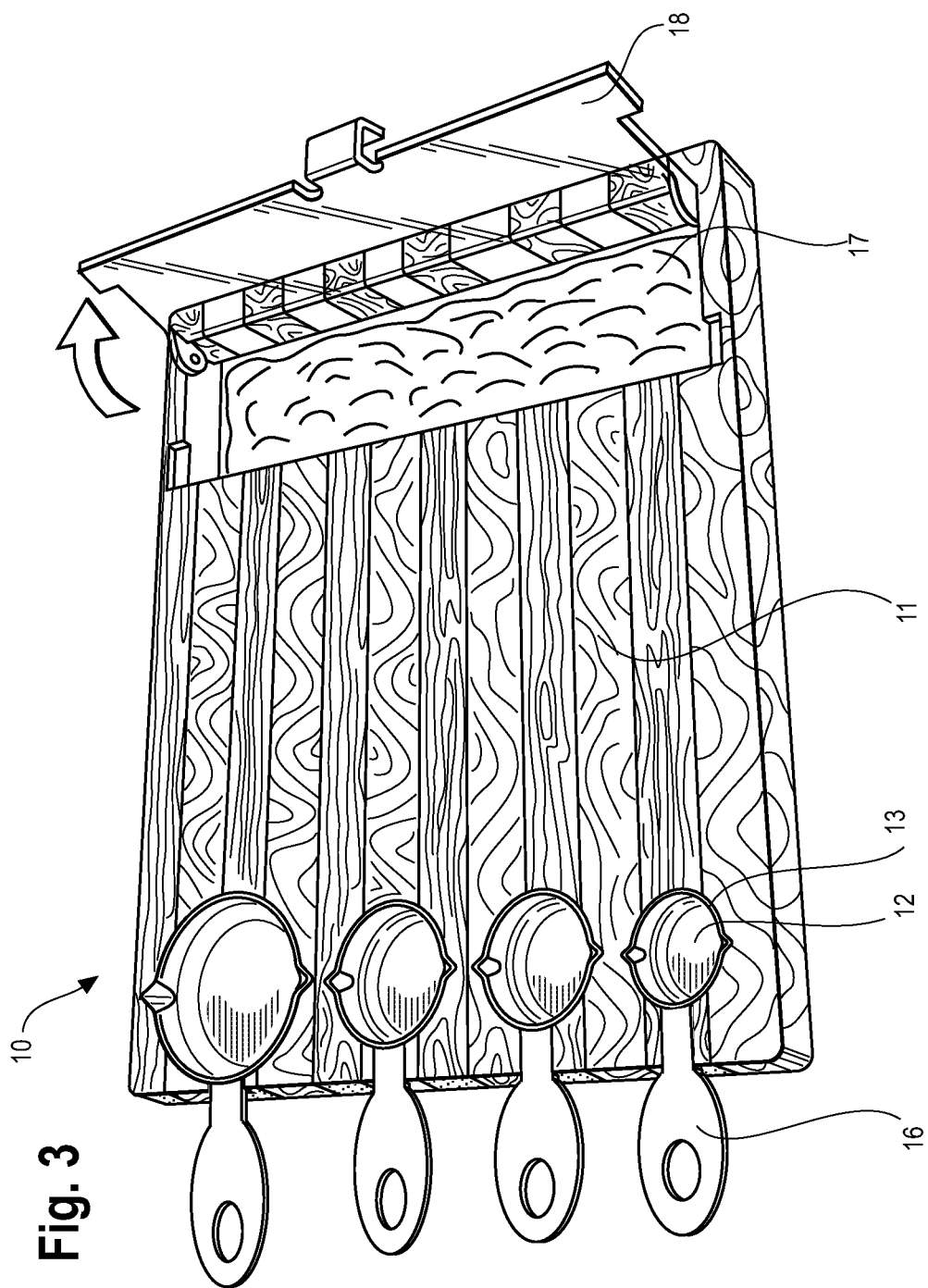
FIG. 3 is a perspective view of an embodiment of a device comprising a cutting surface with integrated measuring receptacles and an integrated waste receptacle.

As illustrated in FIG. 3, the waste receptacle 17 may desirably be located along one side of the cutting board, for example with the one or more measuring receptacles 12 located along an opposite side. This configuration allows a user to quickly and easily separate waste from useful food portions by sliding waste in one direction and useful food portions in the opposite direction. In some embodiments, the waste receptacle 17 may also comprise a lid 18. The lid 18 allows a user to cover waste that may be stored in the waste receptacle 17 for a period of time, such that the user may perform any number of actions before emptying the waste receptacle 17. As illustrated in FIG. 3, it may be desirable for the lid 18 to be made of a see-through material, such as clear plastic, so that one may easily be able to determine if waste is present in the waste receptacle 17.

In some embodiments, the entire upper planar surface 11 acts as a cutting surface. For example, in the embodiments illustrated in FIGS. 1 to 3 and described above, the receptacles 12 are inset directly into the cutting surface of the cutting board. In other embodiments, however, the entire upper planar surface 11 may not be configured to act as a cutting surface. Rather, in some embodiments, only a portion of the upper planar surface 11 comprises a cutting surface.

Figure 4:
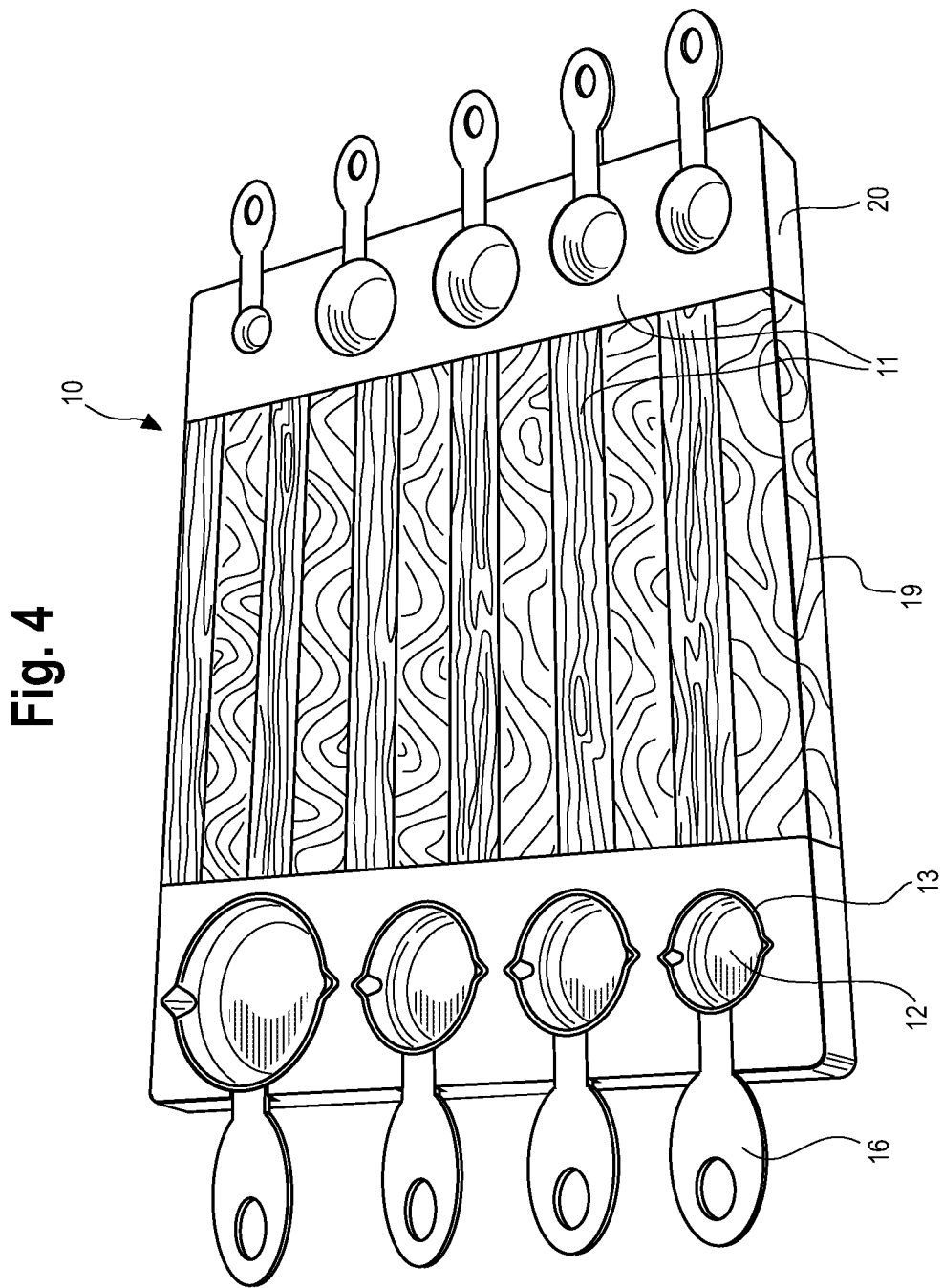
FIG. 4 is a perspective view of an embodiment of a device comprising a base and a removable cutting surface, showing an arrangement in which the base is coupled with and supporting both the cutting surface and the removable measuring receptacles.

For example, in some embodiments, the device 10 comprises a base 20 and an element comprising a cutting surface 19. The base 20 and the element comprising a cutting surface 19 are configured to together provide an upper planar surface 11. The one or more receptacles 12 may be integrated with the base 20 such that the tops of the receptacle walls 13 are substantially flush with the upper planar surface 11. An embodiment comprising a base 20 and an element comprising a cutting surface 19 is illustrated in FIG. 4.

Figure 5:
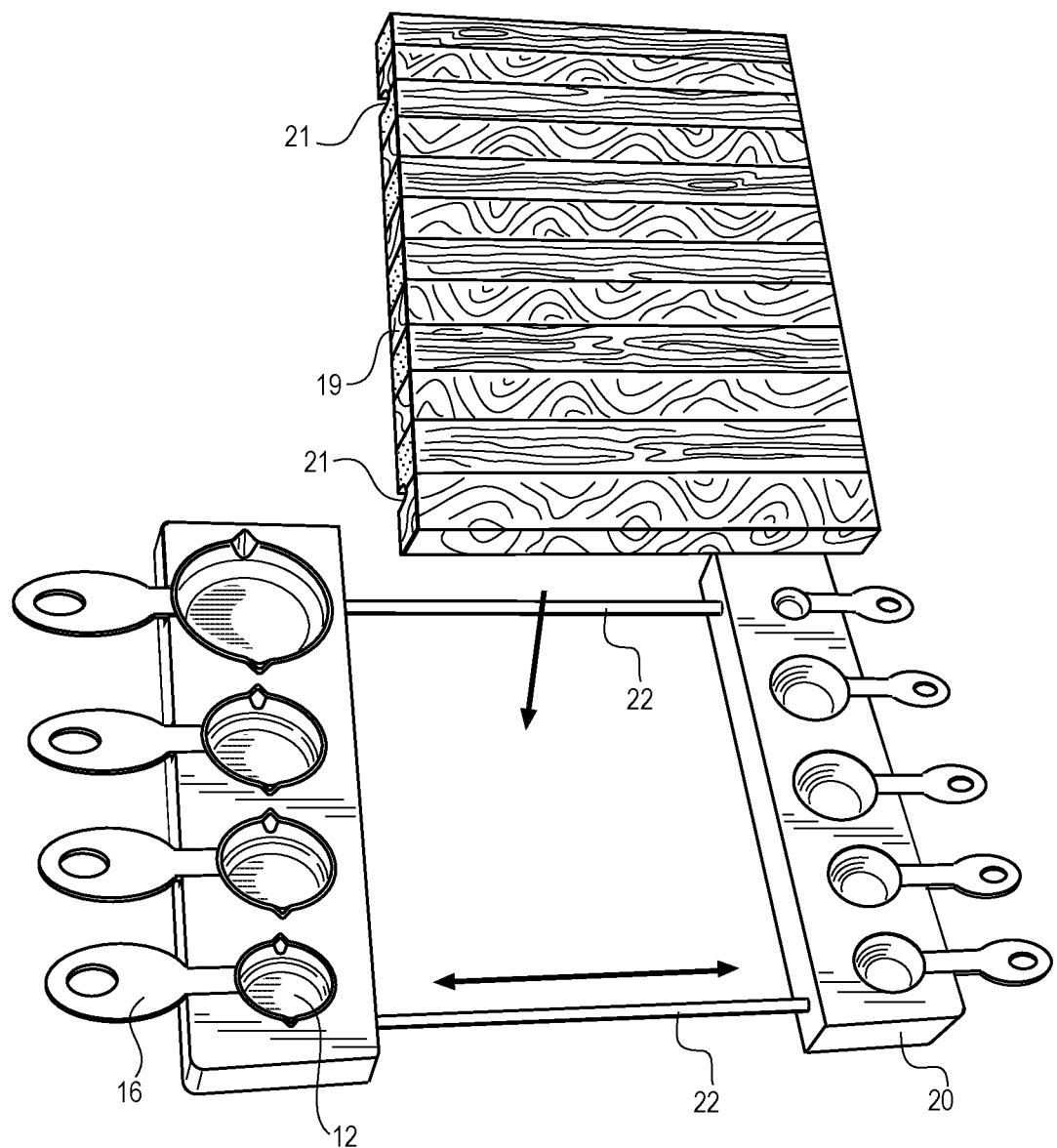
FIG. 5 is a perspective view of an embodiment of a device comprising a base and a removable cutting surface, showing an arrangement in which the cutting surface is removed from the base.

As illustrated in FIG. 5, the element comprising a cutting surface 19 may be removable from the base 20. The removable coupling of the base 20 and the element comprising the cutting surface 19 may be provided by any manner known in the art. In the embodiment illustrated in FIG. 4, for example, the element comprising the cutting surface 19 may have one or more slots 21 running across its bottom. Desirably the element comprising the cutting surface 19 comprises at least two slots 12, with each of the two slots being located near each of two opposed ends of the element to provide stability. The slots 21 on the bottom of the element comprising the cutting surface 19 are configured to couple to one or more rods 22 on the base. Accordingly, a user may place the element comprising the cutting surface 19 on the base by lining up the slots 21 with the rods 22 and pressing the element comprising the cutting surface 19 into place, such that the cutting surface and the top of the base form a planar surface 11. A user may then remove the element comprising the cutting surface 19 from the base 20 by simply pulling up on the ends of the element comprising the cutting surface 19. The one or more receptacles 12 are desirably independently removable from the base 20.

Using the embodiment illustrated in FIG. 5, for example, the element comprising the cutting surface 19 could be removed from the base 20 and washed, and then returned to the base for additional use. The element comprising the cutting surface 19 could also be used and/or stored separately from the base and the receptacles. In some embodiments, the rods 22 could also be collapsed. For example, the rod 22 could be configured to telescope, such as into the body of the base 20. Accordingly, the two sides of the base 20 could be brought together for easy and efficient storage. Although the embodiment illustrated in FIGS. 4 and 5 comprises measuring receptacles 12 on each side of the base 20, in some embodiments, receptacles may only be located on one side of the base. In those embodiments, the side of the base 20 that does not comprise any measuring receptacles 12 may be very thin. As such, the base 20 may be collapsible so as to take up little more space than the measuring receptacles 12 integrated therein.

It is also contemplated that, in some embodiments, the element comprising the cutting surface 19 could be coupled to multiple bases 20, with each base being configured to have different receptacles 12, e.g. receptacles for measuring different amounts. For example, a user could have a first base 20 that would comprise smaller (e.g. tablespoon and/or teaspoon) measurements, such as might be useful for the chopping and/or crushing of herbs, spices, seeds, etc, and a second base 20 that would comprise larger (e.g. cup) measurements, such as might be useful for the chopping and/or slicing of vegetables and meats. Because each base 20 would be collapsible, storage of the various components of the device 10 would be easy and efficient.

The cutting surface may made of any material known in the art to be suitable for its desired use. For example, where the cutting board 10 is to be used for food preparation in a kitchen, the cutting surface may be made of a material known to be suitable for food preparation, such as materials selected from the group consisting of wood, plastic, metal, and recycled materials. In some embodiments, the cutting surface may also be treated so as to be antibacterial and/or antimicrobial.

Although embodiments of the cutting board 10 described herein have generally been described in connection with food preparation, the cutting board of the present invention is not limited to use in food preparation applications. Rather embodiments of the cutting board 10 may be configured to use in any industry in which a material is cut, crushed, or otherwise broken down into smaller fragments and measured. For example, embodiments of the cutting board 10 may be useful in the pharmaceutical industry, such as for pharmaceutical compounding or medicine preparation. Embodiments of the cutting board 10 may be used in any industry in order to streamline the preparation and accurate measurement of various materials.

It can be seen that the described embodiments provide a unique and novel cutting board that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A cutting board assembly consisting of:
   a. a wooden structure comprising an upper planar surface, at least a portion of which provides a cutting surface for food articles, and a lower surface, the upper and lower surface being connected by at least one continuous sidewall; and
   b. a plurality of measuring receptacles, each of the measuring receptacles having a defined volume, each of the measuring receptacles comprising a top, and each of the measuring receptacles being independently coupleable with and removable from the wooden structure;
   wherein the upper planar surface of the wooden structure comprises a plurality of recesses, each of the recesses being configured to couple with one of the measuring receptacles such that the top of the measuring receptacle is substantially flush with the upper planar surface of the wooden structure;
   wherein the recesses are hollowed out of the wooden structure, each recess comprising a lower surface that is located between the upper planar surface of the wooden structure and the lower surface of the wooden structure, such that the recesses do not extend through the lower surface of the wooden structure; and
   wherein each of the measuring receptacles comprises a handle and wherein the upper planar surface of the cutting board comprises a plurality of handle recesses, each of the handle recesses being configured to couple with the handle of one of the plurality of measuring receptacles when the measuring receptacle is coupled with the cutting board.

2. The assembly of claim 1, wherein each of the measuring receptacles has a volume that is selected from the group consisting of a cup, a fraction of a cup, a tablespoon, a fraction of a tablespoon, a teaspoon, and a fraction of a teaspoon.

3. The assembly of claim 2, wherein at least a first measuring receptacle has a volume that is distinct from the volume of a second measuring receptacle.

4. The assembly of claim 1, wherein the cutting surface is antibacterial or antimicrobial.

5. The assembly of claim 1, wherein the upper planar surface of the cutting board further comprises a waste receptacle.

6. The assembly of claim 1, wherein at least one of the recesses is configured to provide a friction fit with one of the measuring receptacles.

7. The assembly of claim 1, wherein each of the recesses comprises a periphery that substantially corresponds with a periphery of the top of one of the measuring receptacles.

8. An assembly comprising:
a. a cutting board comprising an upper planar surface and a lower surface, the upper planar surface being sized and configured to provides a cutting surface for food articles;
b. a base configured to couple to the lower surface of the cutting board, the base comprising an upper planar surface configured to support one or more measuring receptacles, the upper planar surface of the cutting board and the upper planar surface of the base being aligned to together provide a flat working surface, such that a first portion of the working surface is formed by the upper planar surface of the cutting board and a second portion of the working surface is formed by the upper planar surface of the base; and
c. a plurality of measuring receptacles, each of the measuring receptacles comprising a top, the tops of the measuring receptacles being substantially flush with the upper planar surface of the base and each of the measuring receptacles being independently removable from the base;
wherein the cutting board is removable from the base and the base is collapsible.

9. The assembly of claim 8, wherein the measuring receptacles each comprises a handle.

10. The assembly of claim 8, wherein each of the one or more measuring receptacles has a volume that is selected from the group consisting of a cup, a fraction of a cup, a tablespoon, a fraction of a tablespoon, a teaspoon, and a fraction of a teaspoon.

11. An assembly comprising:
a. a cutting board comprising an upper planar surface and a lower surface, the upper planar surface being sized and configured to provides a cutting surface for food articles;
b. a base configured to couple to the lower surface of the cutting board, the base comprising an upper planar surface configured to support one or more measuring receptacles, the upper planar surface of the cutting board and the upper planar surface of the base being aligned to together provide a flat working surface, such that a first portion of the working surface is formed by the upper planar surface of the cutting board and a second portion of the working surface is formed by the upper planar surface of the base; and
c. a plurality of measuring receptacles, each of the measuring receptacles comprising a top, the tops of the measuring receptacles being substantially flush with the upper planar surface of the base and each of the measuring receptacles being independently removable from the base;
wherein the cutting board is removable from the base; and wherein
the cutting board comprises one or more slots running across a bottom surface,
the base comprises one or more rods, and
the one or more slots are configured to couple with the one or more rods.

12. The assembly of claim 11, wherein the one or more rods are configured to telescope in order to collapse the base.

13. An assembly comprising:
a. a cutting board comprising an upper planar surface and a lower surface, the upper planar surface being sized and configured to provides a cutting surface for food articles;
b. a base configured to couple to the lower surface of the cutting board, the base comprising an upper planar surface configured to support one or more measuring receptacles, the upper planar surface of the cutting board and the upper planar surface of the base being aligned to together provide a flat working surface, such that a first portion of the working surface is formed by the upper planar surface of the cutting board and a second portion of the working surface is formed by the upper planar surface of the base;
c. a plurality of measuring receptacles, each of the measuring receptacles comprising a top, the tops of the measuring receptacles being substantially flush with the upper planar surface of the base and each of the measuring receptacles being independently removable from the base; and
d. an additional base;
wherein the cutting board and the additional base are configured to together provide a second substantially flat working surface; and
the additional base is configured to support a second set of one or more measuring receptacles, such that the tops of the second set of one or more measuring receptacles are substantially flush with the second working surface; and
wherein at least one of the measuring receptacles in the second set has a volume that is distinct from the volume or volumes provided by the measuring receptacles of element c.

14. A cutting board assembly consisting of:
a. a wooden structure comprising an upper planar surface, at least a portion of which provides a cutting surface for food articles, and a lower surface, the upper and lower surface being connected by at least one continuous sidewall; and
b. a plurality of measuring receptacles, each of the measuring receptacles having a defined volume, each of the measuring receptacles comprising a top, and each of the measuring receptacles being independently coupleable with and removable from the wooden structure;
wherein the upper planar surface of the wooden structure comprises a plurality of recesses, each of the recesses being configured to couple with one of the measuring receptacles such that the top of the measuring receptacle is substantially flush with the upper planar surface of the wooden structure;
wherein the recesses are hollowed out of the wooden structure, each recess comprising a lower surface that is located between the upper planar surface of the wooden structure and the lower surface of the wooden structure, such that the recesses do not extend through the lower surface of the wooden structure; and
wherein at least one of the recesses comprises a wall having a coating that reduces friction.

15. A cutting board assembly consisting of:
a. a wooden structure comprising an upper planar surface, at least a portion of which provides a cutting surface for food articles, and a lower surface, the upper and lower surface being connected by at least one continuous sidewall; and
b. a plurality of measuring receptacles, each of the measuring receptacles having a defined volume, each of the measuring receptacles comprising a top, and each of the measuring receptacles being independently coupleable with and removable from the wooden structure;
wherein the upper planar surface of the wooden structure comprises a plurality of recesses, each of the recesses being configured to couple with one of the measuring receptacles such that the top of the measuring receptacle is substantially flush with the upper planar surface of the wooden structure;

wherein the recesses are hollowed out of the wooden structure, each recess comprising a lower surface that is located between the upper planar surface of the wooden structure and the lower surface of the wooden structure, such that the recesses do not extend through the lower surface of the wooden structure; and wherein at least one of the recesses is marked to indicate the volume of the measuring receptacle with which it is configured to couple.

* * * * *